United States Patent [19]
Mullee

[11] Patent Number: 5,746,993
[45] Date of Patent: May 5, 1998

[54] PROCESS FOR MANUFACTURE OF ULTRA-HIGH PURITY AMMONIUM HYDROXIDE

[75] Inventor: William H. Mullee, Portland, Oreg.

[73] Assignee: Advanced Micro Devices, Inc., Sunnyvale, Calif.

[21] Appl. No.: 733,277

[22] Filed: Oct. 17, 1996

[51] Int. Cl.[6] .................................................. C01C 1/00
[52] U.S. Cl. .................................................. 423/352
[58] Field of Search ............................................. 423/352

[56] References Cited

U.S. PATENT DOCUMENTS

| | | | |
|---|---|---|---|
| 2,701,182 | 2/1955 | Sellers et al. | 423/352 |
| 4,291,006 | 9/1981 | Pagani et al. | |
| 4,572,769 | 2/1986 | Shimizu. | |
| 4,634,509 | 1/1987 | Shimizu et al. | |
| 4,841,998 | 6/1989 | Bruya. | |
| 5,114,694 | 5/1992 | Grotz, Jr. | 423/352 |
| 5,393,386 | 2/1995 | Aoyama et al. | |

FOREIGN PATENT DOCUMENTS

| | | | |
|---|---|---|---|
| 579943 | 7/1959 | Canada | 423/352 |
| 591314 | 1/1960 | Canada | 423/352 |
| 2557568 | 7/1985 | France | 423/352 |
| 111233 | 7/1982 | Japan | 423/352 |
| 104020 | 6/1983 | Japan | 423/352 |

OTHER PUBLICATIONS

"Tetrafluoroethylene Copolymers With Perfluorovinyl Ethers"; Kirk–Othmer Encyclopedia of Chemical Technology pp. 42–49 (1968).

"Ammines"; Kirk–Othmer Encyclopedia of Chemical Technology pp. 92–94 (1968).

Primary Examiner—Wayne Langel
Attorney, Agent, or Firm—Foley & Lardner

[57] ABSTRACT

A process for obtaining an ultra-high purity aqueous ammonium hydroxide solution according to the invention includes the steps of reacting highly pure, typically electronics grade, ammonia ($NH_3$) with ultrapure water (upw) under conditions effective to produce an ultra-high purity stream of aqueous ammonium hydroxide ($NH_4OH$) which is available for immediate use in a wide variety of applications especially those requiring high purity aqueous solutions of ammonium hydroxide.

8 Claims, 1 Drawing Sheet

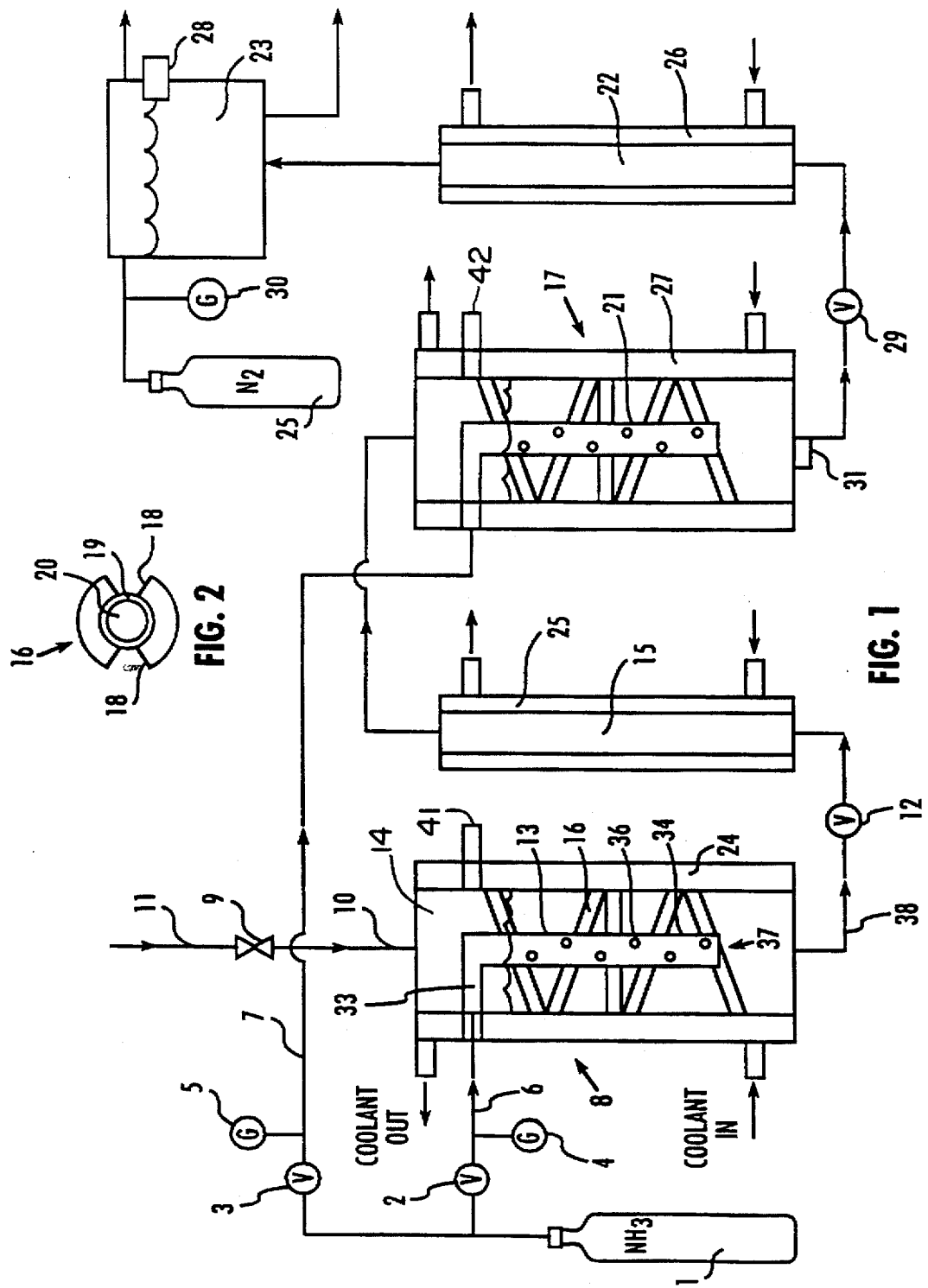

1

PROCESS FOR MANUFACTURE OF ULTRA-HIGH PURITY AMMONIUM HYDROXIDE

TECHNICAL FIELD

This invention relates to an improved process for making an ammonium hydroxide solution, particularly a continuous process for producing an ultra-high purity aqueous solution of ammonium hydroxide suitable for use in a wide variety of applications.

BACKGROUND OF THE INVENTION

Aqueous ammonium hydroxide solutions for use in semiconductor chip fabrication cleaning operations are usually manufactured by a known batch process wherein a large tank (e.g., 3000 gallons) is first filled with pure water which is then pumped to an injector/sparger wherein it is mixed and combined with ammonia gas. The resulting ammonium hydroxide solution is then recirculated back to the reactor tank in a closed loop until the target level of ammonium hydroxide, usually 29 wt. %, is attained. Once the target level is achieved, the process is terminated and the tank is drained.

Such a batch process has a number of disadvantages. First, the emptied tank must be cleaned prior to re-use. Second, when the tank is opened to the air, ammonium hydroxide and ammonia are lost and the product picks up contaminants. The introduced contaminants make the product unsuitable for applications requiring high purity ammonium hydroxide. Additionally, substantial numbers of valves and pumps are required in the typical batch process, and the quantity of ammonium hydroxide solution produced in this type of process generally exceeds immediate needs. Therefore, in most circumstances the bulk of the product must be stored for an extended period in a series of storage tanks. Extended storage results in further contamination and reduction in the concentration of ammonium hydroxide.

Reduction in the concentration of ammonium hydroxide occurs because of loss of ammonia from the solution which results due to the reversible nature of the reaction forming ammonium hydroxide and the high volatility of ammonia. Because ammonium hydroxide solution utilized in semiconductor chip fabrication must be ultrapure and of precise concentration, the above problems regarding contaminants and storage are serious drawbacks with the batch process of ammonium hydroxide production.

SUMMARY OF THE INVENTION

A process for obtaining an ultra-high purity aqueous ammonium hydroxide solution according to the invention includes the steps of reacting highly pure, typically electronics grade, ammonia ($NH_3$) with ultrapure water (upw) under conditions effective to produce an ultra-high purity stream of aqueous ammonium hydroxide ($NH_4OH$) which is available for immediate use in a wide variety of applications especially those requiring high purity aqueous solutions of ammonium hydroxide.

According to one aspect of the invention, a process for the production of aqueous ammonium hydroxide, comprising the steps of:

(a) injecting gaseous ammonia into a closed reactor vessel through a sparger tube that releases the ammonia within the reactor vessel;

(b) adding water to the reactor vessel so that the gaseous ammonia comes in contact with the water and forms ammonium hydroxide;

(c) cooling the reactor vessel as the ammonium hydroxide is formed to maintain a reaction temperature effective to promote the reaction between ammonia and water;

(d) maintaining a quantity of ammonium hydroxide solution in the reactor vessel;

(e) withdrawing ammonium hydroxide solution from the reactor vessel; and (f) cooling the ammonium hydroxide solution after it is withdrawn from the reactor vessel.

Steps (a) to (f) are conducted substantially concurrently so that water and ammonia are added and ammonium hydroxide solution is withdrawn, without recirculation back to the reactor vessel, in a manner effective to provide a substantially steady state of reaction within the reactor vessel.

An apparatus according to the invention for carrying out such a process includes an ammonia tank or cylinder containing pressurized ammonia gas, a source of pressurized water such as a central water system, and at least one closed reactor vessel having an internal chamber with a sparger tube disposed therein. One or more baffles are disposed in the internal chamber such that the sparger tube penetrates the baffles and has an outlet opening disposed below the baffles, with the baffles extending from an outer peripheral surface of the sparger tube to an inner peripheral surface of the reactor vessel. The reactor has an inlet for admitting water to the internal chamber and an outlet for removing liquid ammonium hydroxide from the internal chamber. A first conduit connecting the ammonia tank to the sparger tube includes a first valve for regulating flow of ammonia gas from the ammonia tank into the sparger tube, and a second conduit connects the pressurized water source to the inlet of the internal chamber at a location spaced from the sparger tube. The reactor is designed for one-way product flow and preferably lacks a liquid recirculation loop of the kind used in batch reactors. Further preferred features of the apparatus of the invention are set forth in the detailed description that follows.

BRIEF DESCRIPTION OF THE DRAWING

The invention will be described with reference to the accompanying drawings, wherein like numerals denote like elements, and:

FIG. 1 is a schematic diagram of an apparatus according to the invention for carrying out a process for producing ultrapure aqueous ammonium hydroxide solution.

FIG. 2 is a top plan view a baffle used in the apparatus of FIG. 1.

DETAIL DESCRIPTION OF PREFERRED EMBODIMENTS

Referring to FIGS. 1 and 2, an ammonia tank 1 is preferably heated by suitable means, such as external electrical heating tape or a circulated liquid heat exchange jacket, to prevent the tank pressure from dropping during ammonia release. Valves 2 and 3 are located upstream from the pressure gauges 4 and 5 in the lines 6 and 7 leading from ammonia tank 1 to regulate the reaction rate in a pair first of first and second reactor vessels or columns 8 and 17. Water from a pressurized water line 11 is gravity fed or pumped into reactor 8, the amount thereof being regulated by the internal pressure within the internal chamber 14 of the closed reactor vessel 8. A check valve 9 is provided in line 10 leading from the ultrapure water line 11 to ensure that a build up of pressure build in the first reactor column 8 does not cause the ammonium hydroxide solution to back up into water line 11.

Ammonium hydroxide forms as ammonia gas is injected into a perforated PFA sparge tube 13 immersed in water from line 11. In the embodiment shown, tube 13 is L-shaped and includes a lateral inlet 33 that receives ammonia from tank 1 and an elongated perforated section 34 that is coaxially oriented in the lengthwise direction of reactor 8. A series of circular PFA baffles 16 having opposed cutaway openings 18 are mounted on perforated section 34 of tube 13 to hold tube 13 in a coaxial position within the cylindrical internal chamber 14 of reactor 8. Sparger tubes for introduction of a gas into a liquid, preferably made of PFA (perfluoroalkoxyethylene), PTFE (polytetrafluoroethylene) or a similar unreactive fluorocarbon-based plastic, are available commercially.

Use of baffles 16 in the present invention provide a more efficient reaction and mixing and also support the sparge tubes through which the ammonia is introduced into the reactor vessels 8 and 17. FIG. 2 is a diagram of such a baffle 16 which is in the form of a PFA disk with opposed, sectional cutaways 18. Baffles 16 each have a hub 19 having a central hole 20 through which sparge tubes 13 and 21 fit. Baffles 16 can be friction fitted or bonded to sparge tubes 13 and 21, as appropriate, and may be arranged horizontally or at an angle as depicted in the schematic diagram illustrated in FIG. 1. The cutaway openings 18 of disks 16 are optimally arranged in staggered positions to maximize mixing and reaction between water and ammonia in first column 8.

A coolant such as automotive antifreeze (glycol/water mixture) is circulated through a cooling jacket 24 disposed about reactor vessel 8. Similar, preferably separate, cooling jackets 25, 26, and 27 are provided for heat exchangers 15, 22 and secondary reactor 17, respectively as described hereafter.

Ammonia from tube 13 escapes through perforations 36 and/or a bottom opening 37 of tube 13 into water admitted into reactor 8 from line 11. Baffles 16 maximize the amount of ammonia that dissolves in the water to form ammonium hydroxide. During normal operation, water containing dissolved ammonia is continuously withdrawn from the bottom of reactor 8 through a line 38 at a rate regulated by a valve 12. Flow conditions are adjusted between column 8 and the heat exchanger 15 using valves 2, 3 and 12 to maintain a liquid level in first column 8 from about half to three-quarters full so that the perforations 36 in PFA sparge tube 13 remain immersed in water to maximize the amount of ammonia that mixes and reacts with water to form ammonium hydroxide. In general, the process operates best when gas flow is maximized and water flow is minimized, which provides for a higher content of ammonium hydroxide in the resulting solution.

Ammonium hydroxide solution produced in the first reactor 8 flows to the first heat exchanger 15 which cools the temperature of the solution from temperatures as high as 90° C. to a lower temperature such as 10° C. or cooler. Ammonium hydroxide solution from the first heat exchanger 15 then enters the second reactor 17 where it is simultaneously mixed and reacted with more ammonia gas introduced through sparge tube 21 in a process identical to that which occurred in the first reactor vessel 8 except that the aqueous solution entering the second reaction vessel 17 already contains ammonium hydroxide. The further concentrated ammonium hydroxide solution is then passed through a second heat exchanger 22 where the solution is again cooled to about 10° C. or less before being fed into a PFA-lined storage tank 23 prior to use.

Holding tank 23 may optionally be provided with a high level sensor 28 forming part of an automated control system that controls the rate of throughput in the system. Upon detection of a high level of ammonium hydroxide solution in tank 23, the automated control system, which may comprise a programmable logic controller or PC-based system, can fully or partially close valves 2, 3, 12, and 29 in order to slow or halt the rate of reaction in the system. Conversely, a low level sensor can be used to open valves 2, 3, 12, and 29 further, if within acceptable operating conditions, to increase the rate of reaction to meet product demand. The automated control system may also be programmed using an ammonium hydroxide concentration sensor 31. Sensor 31, disposed for example at the outlet of second reactor vessel 17, determines the concentration of the product and adjusts the rate of ammonia gas flow by controlling valves 2 and 3. High level sensors 41 and 42 may similarly be provided in reactors 8 and 17 to control the liquid level in each respective reactor.

Tank 23 is preferably a flexible-walled plastic tank lined with high density polyethylene (HDPE). It has been found that HDPE is more unreactive with the ammonium hydroxide solution than fluorocarbon-based plastics, and thus it is preferred that tank 23 be made of or lined on the inside with HDPE. The size of tank 23 should correspond to the amount of ammonium hydroxide solution likely to be used in a period of about 24 hours, preferably 6 hours, since after about six hours storage the solution starts to lose concentration, and at 24 hours deterioration becomes extensive. For semiconductor fabrication operations, the tank size is generally in the range from 50 to 500 gallons.

During operation, input and output of product from tank 23 should be controlled manually or automatically so that tank 23 remains at least 75% full by volume. Excess open space in tank 23 tends to increase the loss of ammonia from the stored solution. An inert gas such as nitrogen is used as a purge gas for the space in tank 23. A tank or cylinder 25 containing pure pressurized nitrogen gas is provided with a pressure gauge 30 so that a positive pressure, for example, about 1 to 4 psig, is maintained within tank 23. Tank 23 is provided with an outlet valve through which a constant slow outflow of purge gas, such as about 0.1 liter/minute, is maintained.

At system start-up, all cooling systems are turned on and allowed to achieve maximum effectiveness and operational capacity before initiating the rest of the ammonium hydroxide production system. Additionally, the rate at which ammonia gas reacts with water is directly dependent upon temperature, where lower temperatures result in increased efficiencies. For example, ammonia will react with water twice as fast when the temperature of the mixture is 0° C. as compared to when the temperature is 2.5° C. Therefore, reaction temperatures ranging from about 0° to 50° C. are specifically preferred with temperatures ranging from 0° to 20° C. being especially preferred.

Ultrapure water (UPW) is flushed through the chemical generation system and adjusted to a rate of between 0.1 and 60 gallons per minute. The flow rate should be consistent with and adjusted to the desired rate of production of $NH_4OH$ (ammonium hydroxide). For the standard production of ammonium hydroxide using this process, ammonia gas ($NH_3$) is allowed into the first reactor 8 at a rate equivalent to 1.75 lbs. $NH_3$ per gallon of UPW. A range of from about 1.5 to 2.2 lbs/$NH_3$ per gallon of UPW is preferred. The reaction requires careful initial adjustment such that the desired rate of ammonia per gallon of upw is achieved after slowly increasing the rate of ammonia introduced into the system over the first 3–5 minutes to allow for thermal stabilization. Care is required to prevent excess $NH_3$ pressure from building up in the reactor such that NH$_3$ is forced out the bottom outlet of the reactor, and the amount of ammonia gas within the reactor vessels should not occupy more than 10–40% of the total interior reactor space because it is important that liquid occupy the remaining space within the reactor vessel.

The feed pressure of ammonia must also be maintained below the inlet pressure of the ultrapure water, which is from about 10–100 psi. This is necessary to prevent the gas from being forced upstream in the water line 10. After the NH$_3$ flow has been increased to maximum and allowed to run at least 15 minutes, the NH$_3$ flow to the second reactor 17 is begun by opening valve 3. NH$_3$ flow startup for the second reactor 17 should duplicate the procedure used for startup of the first reactor 8. The system is preferably operated so that ammonium hydroxide is produced in a steady state approximating the rate at which it is being used. No recirculation of the aqueous ammonium hydroxide solution back to any of the reactor vessels 8 or 17 occurs in this continuous ammonium hydroxide solution formation process.

It is essential that sufficient cooling be provided to the components of the system. A unique feature of the NH$_4$OH generation system of the invention is that it manufactures ultra high purity chemical on a continuous basis as it is required for use. No other known system does this. This generation system is both instantaneous and on-demand, and it thus avoids the loss of titer or reduction in molarity problem encountered where batch systems are used. Tanks of aqueous NH$_4$OH are prone to lose concentration over time due to off-gassing of NH$_3$ due to the reversible nature of the reaction between ammonia and water and because ammonia has a very high vapor pressure. The continuous system of the invention prepares ultrapure NH$_4$OH immediately prior to use so that it is not allowed to sit in a tank and become contaminated or change with respect to concentration of ammonium hydroxide.

It will be understood that the foregoing description is of preferred exemplary embodiments of the invention, and that the invention is not limited to the specific forms shown. For example, the invention may use more or less reactors than the two depicted in FIG. 1. Additionally, the sparge tubes, baffles, reactor designs, and sensors may be modified to reflect desired changes in the system and invention. Additionally, the ammonia used in the invention is not limited to high purity gas, but may include mixtures of ammonia and other gases such as helium, argon, nitrogen, neon, and other inert gases. The ammonia used need not be rigorously anhydrous, and it may thus also contain some water. These and other modifications may be made in the design and arrangement of the elements without departing from the scope of the invention as expressed in the appended claims.

I claim:

1. A process for the production of an ammonium hydroxide solution, comprising the steps of:

(a) injecting gaseous ammonia into a closed first reactor vessel through a sparger tube that releases the ammonia within the first reactor vessel;

(b) adding ultra-pure water to the first reactor vessel so that the ammonia comes in contact with the ultra-pure water and forms the ammonium hydroxide solution;

(c) cooling the first reactor vessel as the ammonium hydroxide solution is formed to maintain a reaction temperature effective to promote the reaction between the ammonia and the ultra-pure water;

(d) maintaining a quantity of the ammonium hydroxide solution in the first reactor vessel;

(e) withdrawing the ammonium hydroxide solution from the first reactor vessel; and (f) cooling the ammonium hydroxide solution after it is withdrawn from the first reactor vessel;

wherein steps (a) to (f) are conducted substantially concurrently so that the ultra-pure water and the ammonia are added and the ammonium hydroxide solution is withdrawn, without recirculation back to the first reactor vessel, in a manner effective to provide a substantially steady state of reaction within the first reactor vessel;

(g) providing the ammonium hydroxide solution from the closed first reactor vessel into a closed second reactor vessel;

(h) injecting gaseous ammonia into the second reactor vessel through a sparger tube that releases the ammonia within the second reactor vessel so that the ammonia comes in contact with the ammonium hydroxide solution and forms a higher concentration ammonium hydroxide solution;

(i) cooling the second reactor vessel as the higher concentration ammonium hydroxide solution is formed to maintain a reaction temperature effective to promote the reaction between the ammonia and the ammonium hydroxide solution;

(j) maintaining a quantity of the higher concentration ammonium hydroxide solution in the second reactor vessel;

(k) withdrawing the higher concentration ammonium hydroxide solution from the second reactor vessel; and (l) cooling the higher concentration ammonium hydroxide solution after it is withdrawn from the second reactor vessel;

wherein steps (g) to (l) are conducted substantially concurrently so that the ammonium hydroxide solution is added and the higher concentration ammonium hydroxide solution is withdrawn, without recirculation back to the second reactor vessel, in a manner effective to provide a substantially steady state of reaction within the second reactor vessel.

2. The process of claim 1, wherein step (c) further comprises maintaining the temperature in the first reactor vessel in the range of about 0° C. to 50° C., and step (f) further comprises cooling the ammonium hydroxide solution to about 10° C. or less.

3. The process of claim 1, wherein the ammonia gas is admitted to the first reactor vessel at a rate in the range of about 1.5 to 2.2 lbs NH$_3$ per gallon of the ultra-pure water solution, and the ammonium hydroxide solution is admitted at a rate in the range of about 0.1 to 60 gallons per minute.

4. The process of claim 1, wherein the amount of the ammonia gas occupies from about 10% to 40% by volume of the first reactor vessel.

5. The process of claim 1, further comprising a step (m) of storing the higher concentration ammonium hydroxide solution in a holding tank for no more than about 24 hours.

6. The process of claim 5, wherein step (m) further comprises storing the higher concentration ammonium hydroxide solution in the holding tank for no more than about 6 hours.

7. The process of claim 5, further comprising a step (n) of controlling production of the higher concentration ammonium hydroxide solution in the second reactor vessel and withdrawal of the higher concentration ammonium hydroxide solution from the holding tank so that the holding tank remains at least about 75% full during operation, and purging the holding tank with an inert gas in a manner effective to reduce loss of concentration of the higher concentration ammonium hydroxide solution during storage.

8. The process of claim 5, wherein the holding tank is a flexible-walled plastic container having an HDPE interior surface.

* * * * *